United States Patent [19]
Messelhi

[11] Patent Number: 5,563,372
[45] Date of Patent: Oct. 8, 1996

[54] INTEGRAL TERMINAL HOUSING HAVING FOLDED RESILIENT SHEET GROMMET WITH SLITS THEREIN

[75] Inventor: Selim Messelhi, Etobicoke, Canada

[73] Assignee: Communications Technology Corporation, Madison, Ala.

[21] Appl. No.: 355,092

[22] Filed: Dec. 13, 1994

Related U.S. Application Data

[63] Continuation of Ser. No. 848,730, Mar. 9, 1992.

[51] Int. Cl.$^6$ .................................................. H01R 13/46
[52] U.S. Cl. .................................................. 174/60; 174/59
[58] Field of Search ................................. 174/50, 59, 60; 220/324

[56] References Cited

U.S. PATENT DOCUMENTS

| | | | |
|---|---|---|---|
| Des. 312,244 | 11/1990 | Collins et al. | D13/152 |
| 2,859,390 | 11/1958 | Baker | 174/59 X |
| 2,956,106 | 10/1960 | Hasselhorn et al. | 174/59 |
| 3,383,009 | 5/1968 | Weikert | 220/324 X |
| 3,857,153 | 12/1974 | Takiguchi et al. | 29/806 X |
| 4,513,171 | 4/1985 | Sutti et al. | 174/59 X |
| 4,647,715 | 3/1987 | Butler | 174/59 X |
| 4,701,574 | 10/1987 | Shimirak et al. | 174/93 |
| 4,704,499 | 11/1987 | Faust | 174/65 G X |
| 4,721,830 | 1/1988 | Dagan et al. | 174/92 X |
| 4,810,829 | 3/1989 | Rutenbeck et al. | 174/41 |
| 4,880,676 | 11/1989 | Puigcerver et al. | 174/93 X |
| 4,944,973 | 7/1990 | Follette . | |
| 4,952,168 | 8/1990 | Schieferly et al. | 439/467 |
| 4,963,698 | 10/1990 | Chang et al. | 29/868 X |
| 4,963,700 | 10/1990 | Olsen et al. | 174/92 X |
| 5,136,121 | 8/1992 | Kluska et al. | 174/93 |

FOREIGN PATENT DOCUMENTS

| | | | |
|---|---|---|---|
| 1170327 | 7/1984 | Canada | 439/467 |

OTHER PUBLICATIONS

The Polecat—Pole Mounted Terminal, Communications Technology Corp., Dallas, Texas, Jun. 1989.

Primary Examiner—Kristine L. Kincaid
Assistant Examiner—Paramita Ghosh
Attorney, Agent, or Firm—Crutsinger & Booth

[57] ABSTRACT

A terminal housing having a entry port formed in one wall thereof in combination with a folded grommet sheet having criss-crossing slits retained in sealing relation with the wall of the housing by a grommet plate. The housing is of unitary construction and has a door portion secured to a body portion by a living hinge and is equipped with spring elements for urging the door portion of the housing toward open and closed positions. The housing is suited for universal mounting on a strand, cable, wall and post or pole. The terminal housing is configured to contain terminal blocks for splices or dropwire installations.

23 Claims, 13 Drawing Sheets

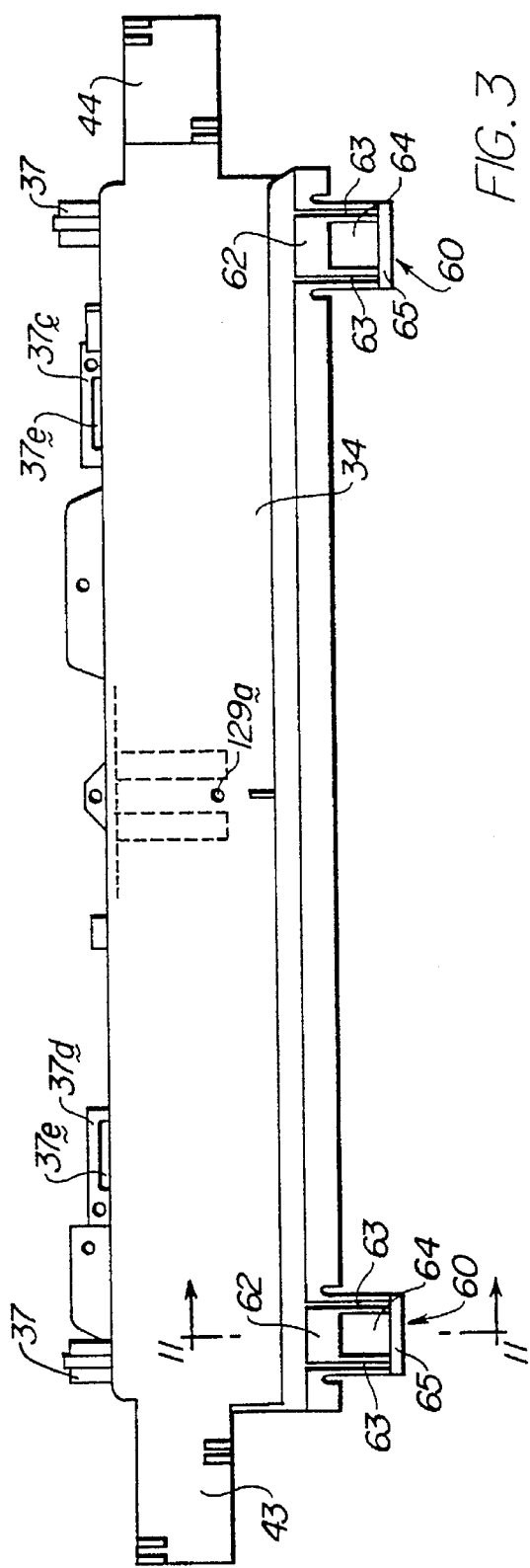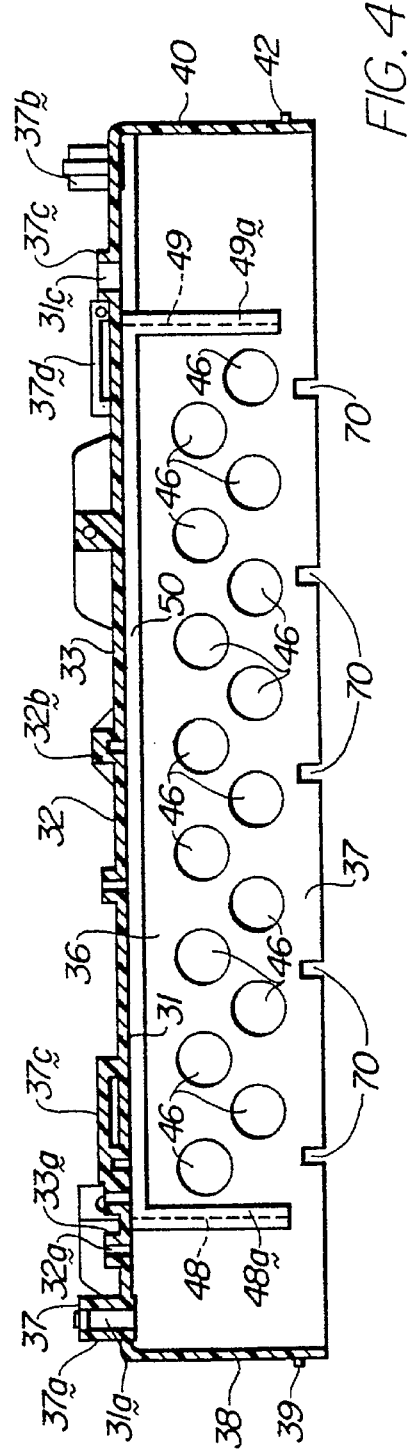

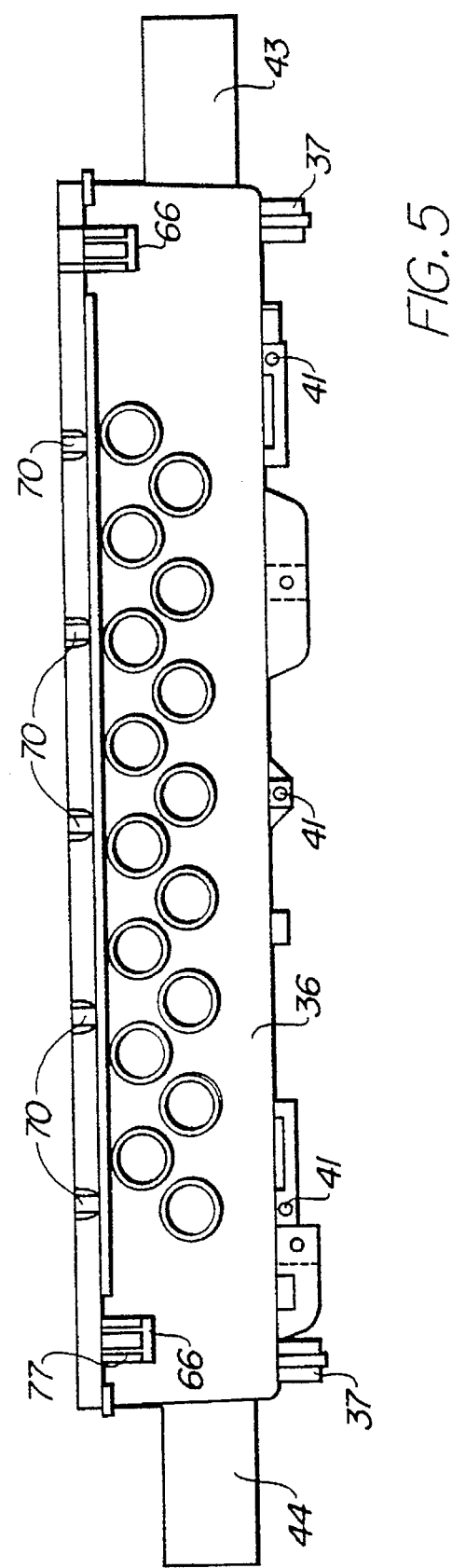

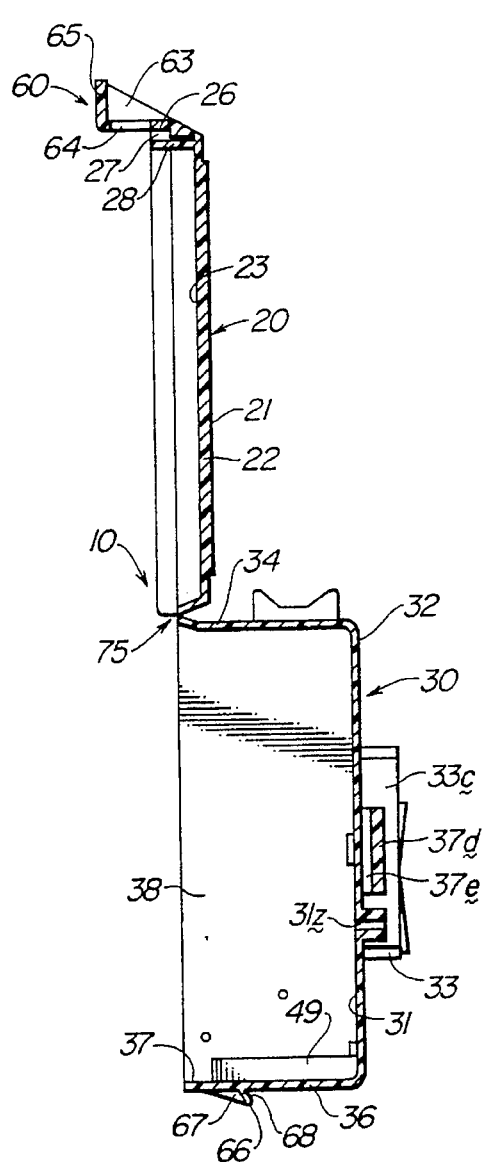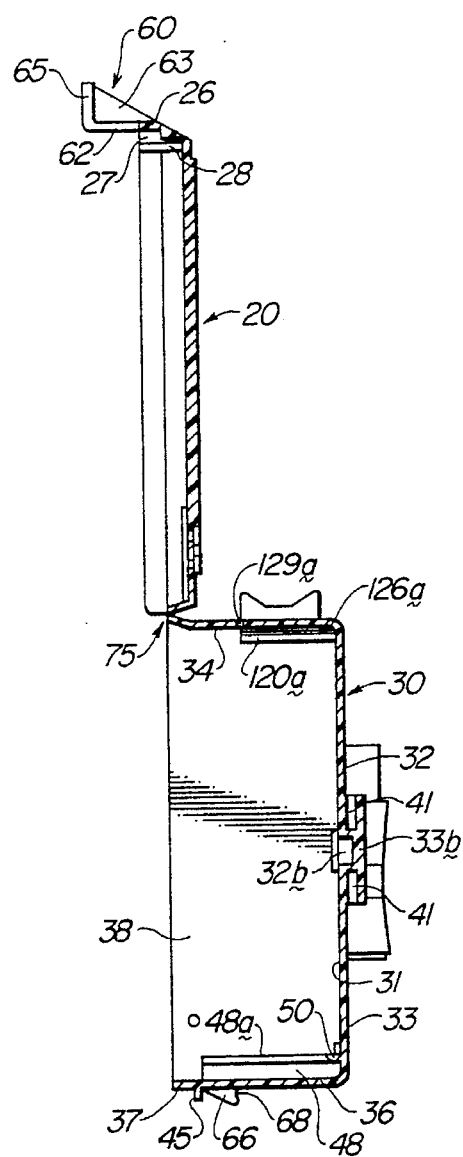
FIG. 7
FIG. 8

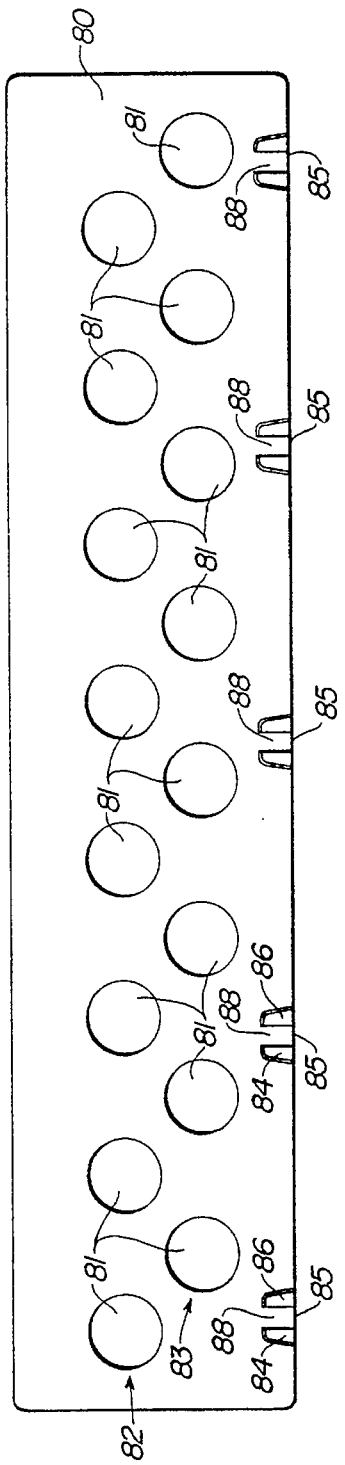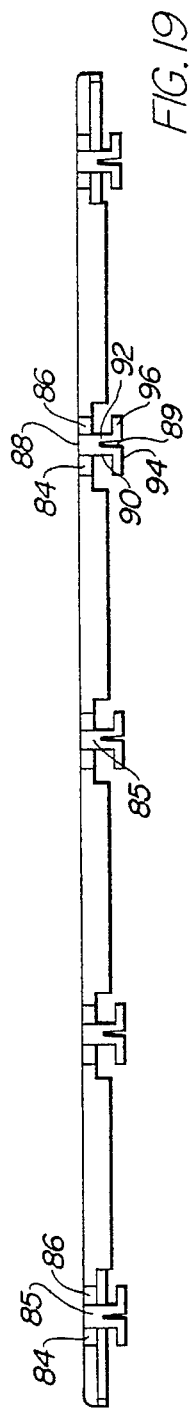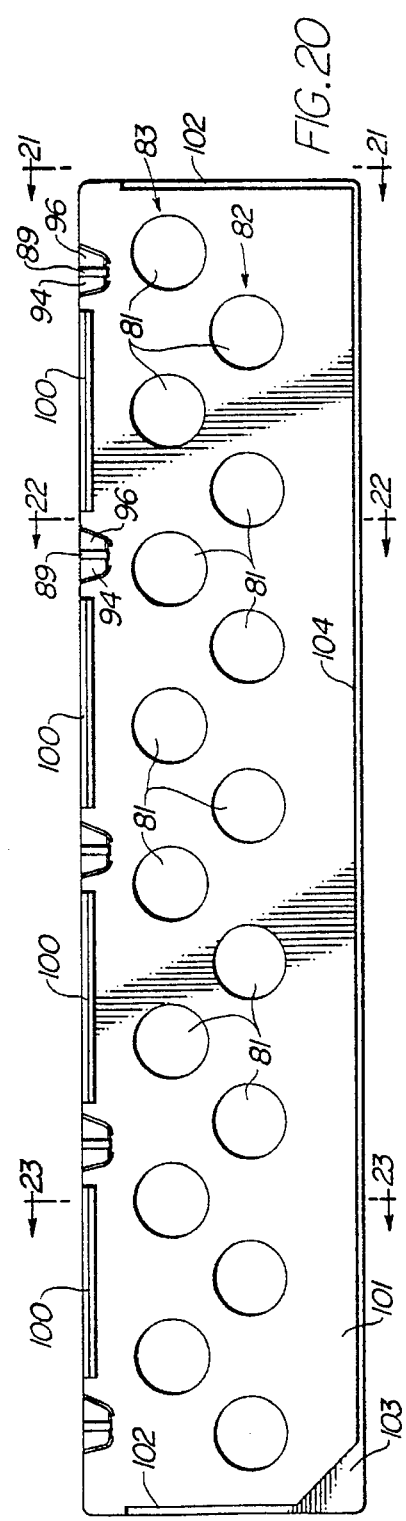

5,563,372

INTEGRAL TERMINAL HOUSING HAVING FOLDED RESILIENT SHEET GROMMET WITH SLITS THEREIN

This is a continuation of application Ser. No. 07/848,730 filed Mar. 9, 1992, now abandoned.

TECHNICAL FIELD

The invention relates to a terminal housing for telecommunication cables forming an enclosure for a cable splice.

BACKGROUND OF INVENTION

Terminal systems are employed for joining ends of conductors in cables for forming a telecommunications network. A pair of insulated wires for conducting electrical signals or optical fibers for conducting light is connected through a terminal block to a corresponding pair of conductors in a communications cable.

Terminal systems may be aerial mounted by suspending a terminal housing from a support strand or cable for a telecommunications cable suspended above the ground between posts or may be secured to a pole, post or wall for underground communication systems.

An enclosure to form a splice in an aerial terminal system is disclosed in U.S. Pat. No. 4,721,830 for protection of a terminal block from the environment, plants and animals. This type of cable enclosure is commercially available from Communications Technology Corporation of Dallas, Tex. under its registered trademark "TERMAX" with a terminal block mounted in the enclosure.

Housings for pole or wall mounted drop wire terminal installations are commercially available from Communications Technology Corporation under its registered trademark "POLECAT". These devices include a metallic or non-metallic housing having a sliding door mounted on a standard WE P-375115 bracket of the type used with WE N-type terminals. The housing has entry ports along two sides with a terminal block mounted in the middle of the housing between the entry ports.

A need exists for a terminal housing configured for use as an aerial terminal or alternatively as a post mounted terminal in communications networks.

SUMMARY OF INVENTION

The terminal housing disclosed herein is preferably of unitary construction and molded of a plastic material wherein a door is connected by a living hinge to a body portion, the door and body portion of the housing being configured to provide environmental protection for a terminal block mounted in the housing. The terminal housing is configured for use as an aerial terminal or alternatively as a post mounted terminal in communications networks.

A slot formed between a rim extending around the periphery of the door and a pair of spaced lugs in a latch receives lip portions of walls forming the body portion of the housing. Latch elements on the door and the body portion of the housing latch the door in a closed position. Spring elements on the door and body portion of the housing resiliently retain the door in an open position to provide access to terminals in the housing.

A resilient grommet sheet has pairs of slits formed therein extending in opposite directions, the grommet sheet being foldable for positioning the slits in juxtaposed relation to sealing engage outer surfaces of a conductor extending through the slits. The resilient grommet sheet is urged into sealing relation with the wall of the housing by a grommet plate which snaps into the housing to provide a seal to prevent intrusion of dust and moisture.

DESCRIPTION OF THE DRAWINGS

Drawings of a preferred embodiment of the invention are annexed hereto so that the invention may be better and more fully understood, in which:

FIG. 3 is a top plan view;

FIG. 4 is a cross-sectional view taken along line 4—4 of FIG. 1;

FIG. 5 is a bottom plan view;

FIG. 7 is a cross-sectional view taken substantially along lines 7—7 of FIGS. 1 and 2;

FIG. 8 is a cross-sectional view taken along lines 8—8 of FIGS. 1 and 2;

FIG. 18 is a top plan view of a grommet plate;

FIG. 19 is a front elevational view of the grommet plate;

FIG. 20 is a bottom plan view of the grommet plate;

Numeral references are employed to designate like parts throughout the various figures of the drawing.

DESCRIPTION OF A PREFERRED EMBODIMENT

Figure 1:
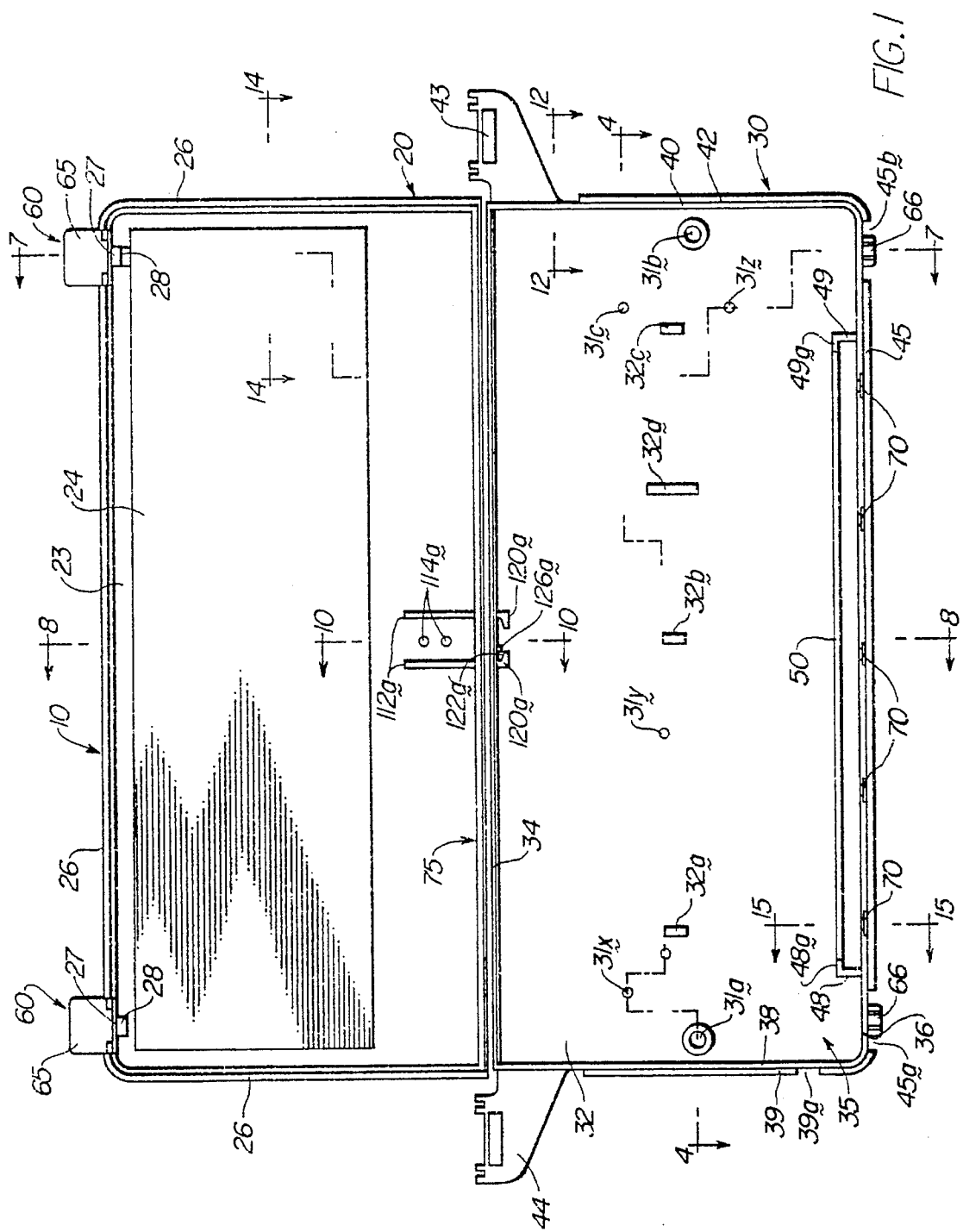
FIG. 1 is a front elevational view of the terminal housing, the door being illustrated in an open position.
Figure 2:
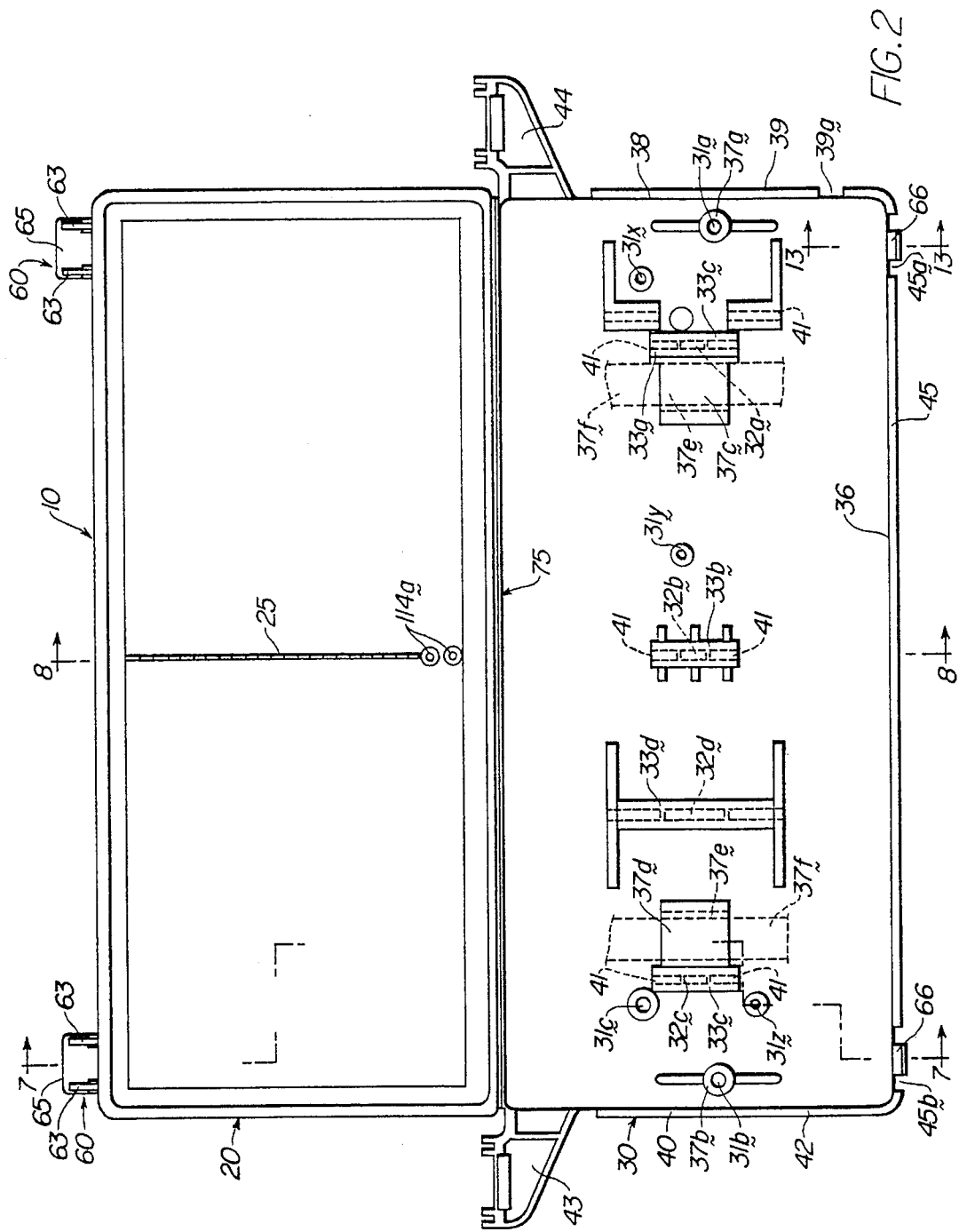
FIG. 2 is a rear elevational view thereof.

Referring to FIG. 1 of the drawing, the numeral 10 generally designates a terminal housing which is preferably of unitary construction formed by a molded door portion 20 and a molded body portion 30 hingedly secured together by a hinge portion 75. The housing 10 is configured to be suspended from a strand or cable for aerial mounting or secured to a post, pole or wall for dropwire terminal installations.

As best illustrated in FIGS. 1, 7, 8 and 13, the door portion 20 of the terminal block comprises a central panel 22 having an outer surface 21 and an inner surface 23. An outer rim 26 extends around three sides of central panel 22. Rims 26 and a pair of lugs 28 being spaced apart to provide a slot 27 therebetween. A central portion of panel 22 is deflected out of the plane of the periphery of the panel to form a recess 24 in the inner surface 23 and a stiffener rib 25 extends transversely of the outer surface 22.

As will be hereinafter more fully explained, a rim 29 extends longitudinally of panel 20 and forms a portion of hinge 75 which pivotally connects the door portion 10 of the terminal housing to the base portion 30.

Figure 13:
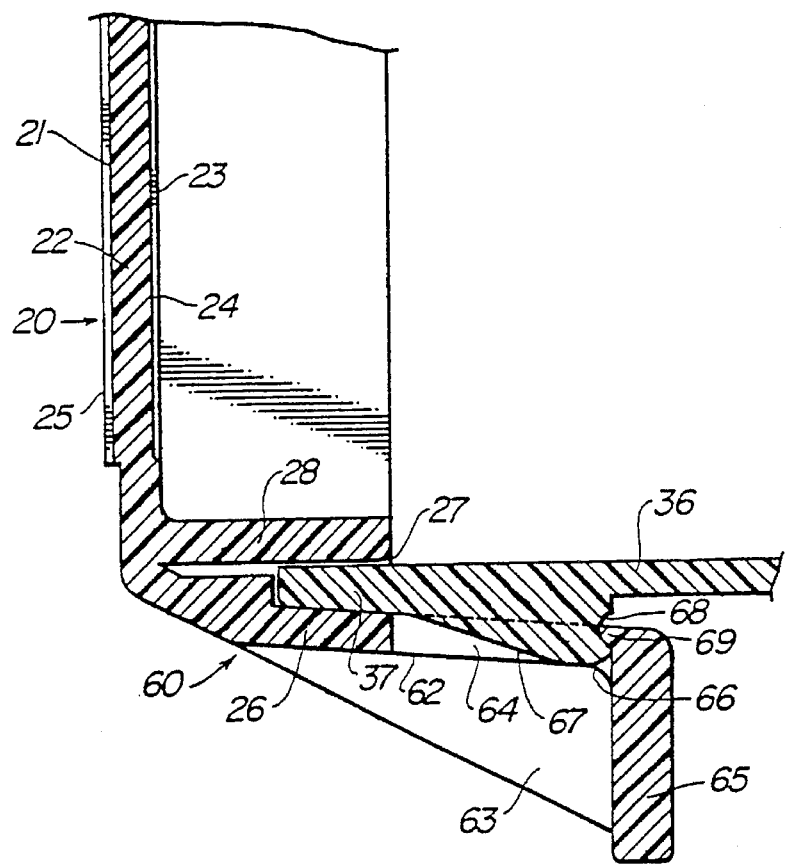
FIG. 13 is a cross-sectional view taken along line 13—13 of FIG. 2, the door being shown in the closed and latched position.

Referring to FIGS. 1, 7 and 8, the body portion 30 of the housing comprises a back wall 32 bounded by top and bottom walls 34 and 36 and end walls 38 and 40 forming a chamber 35. A stub port 47 and entry ports 47a, 47b, 47c and 47d are formed in end wall 40. Bottom wall 36 and end walls 38 and 40 each has a tapered lip portion 37 which extends into slot 27 between outer rim 26 and lugs 28 on door portion 20 when the door portion is moved to the closed position, as illustrated in FIG. 13 of the drawing. The terms "top", "bottom" and "end" refer to the illustrated embodiment. If housing 10 is rotated ninety degrees for mounting on a post, it should be appreciated that walls 34 and 36 would be side walls.

Referring to FIGS. 1, 2, 4 and 8 of the drawing, the inner surface 31 of back wall 32 has a plurality of spaced rectangular shaped sockets 32a, 32b, 32c and 32d formed in a central portion thereof to receive lugs on an internal grounding strip (not shown) to hold the strip in position when secured to the back wall 32 by a single screw extending through aperture 31c. Rectangular shaped socket 32a extends into a boss 33a extending outwardly from the outer surface 33 of back wall 32. It should be noted that socket 32a does not extend all the way through the end of boss 33a.

A pair of loops 37c and 37d are formed on bosses 33a and 33c, loops 37c and 37d having slots 37e to receive a hose type clamp 37f for securing housing 10 to a post or pole.

As best illustrated in FIG. 8, screw holes 41 are formed in opposite ends of bosses 33a, 33b and 33c for mounting a generally channel-shaped external wire organizer.

Holes 31a and 31b extend through the inner surface 31 of back wall 32 into bosses 37a and 37b which project outwardly from the outer surface 33 of back wall 32. Holes 31a and 31b receive screws or bolts for mounting housing 10 on a pole, post or wall. A hole 31c extends through back wall 32 and through a boss 37c extending outwardly from the outer surface 33 of back wall 32.

Brackets 43 and 44 project from end walls 38 and 40 for securing housing 10 to a horizontal strand or cable for aerial mounting.

Apertures 31x, 31y and 31z extend through back wall 32 of the housing 30 to receive screws for mounting a terminal block (not shown) in the housing 10.

As best illustrated in FIGS. 1, 4 and 8 of the drawing, a rib 39 extends outwardly from end wall 38 and a rib 42 extends outwardly from end wall 40 while a rib 45 extends outwardly from bottom wall 36. Rib 39 has a slot 39a formed therein while rib 45 has slots 45a and 45b extending therethrough.

Housing 10 is intended to be used with a modular terminal block in chamber 35 capable of handling multiple pairs of conductors.

As illustrated in FIGS. 4 and 5, bottom wall 36 is perforated and has an array of openings 46 forming entry ports extending therethrough and the inner surface of bottom wall 36 has a pair of upwardly extending spacers 48 and 49 which support inwardly extending ledges 48a and 49a.

An elongated ledge 50 projects from the inner surface 31 of back wall 30 into chamber 35 and has opposite ends connected to ledges 48a and 49a supported above the perforated bottom wall 36 by spacers 48 and 49. Ledges 48a, 49a and 50 preferably lie in a common plane spaced from the plane of perforated bottom wall 36 to form a compartment in chamber 35 for retaining a seal element in sealing relation with perforated bottom wall 36 adjacent entry ports 46.

Figure 11:
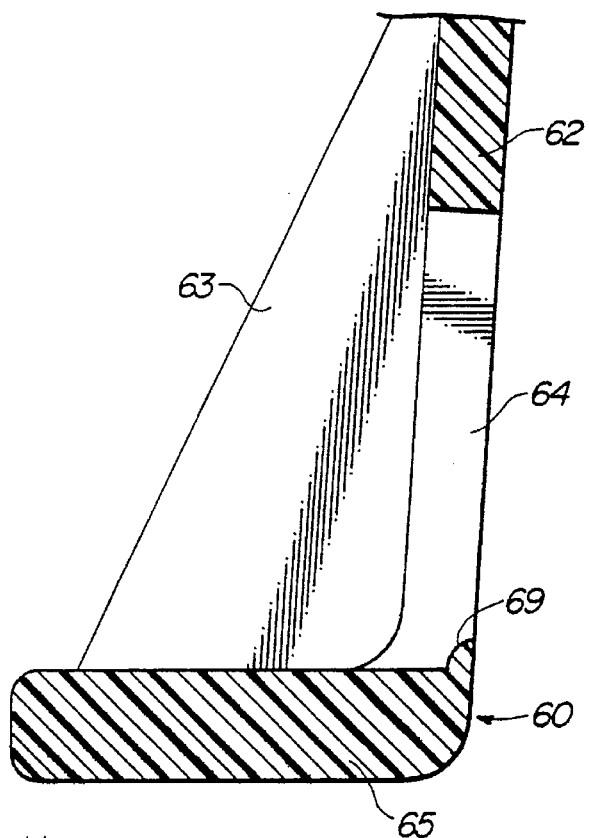
FIG. 11 is a cross-sectional view taken along line 11—11 of FIG. 3.
Figure 12:
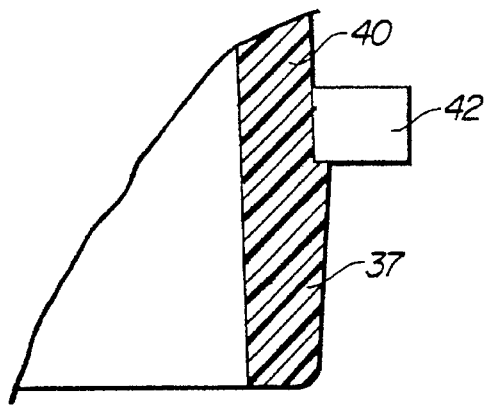
FIG. 12 is a cross-sectional view taken along line 12—12 of FIG. 1.
Figure 14:
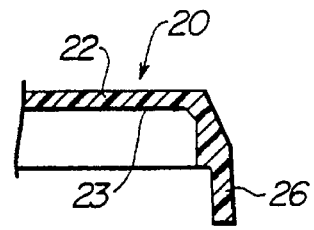
FIG. 14 is a cross-sectional view taken along line 14—14 of FIG. 1.
Figure 16:
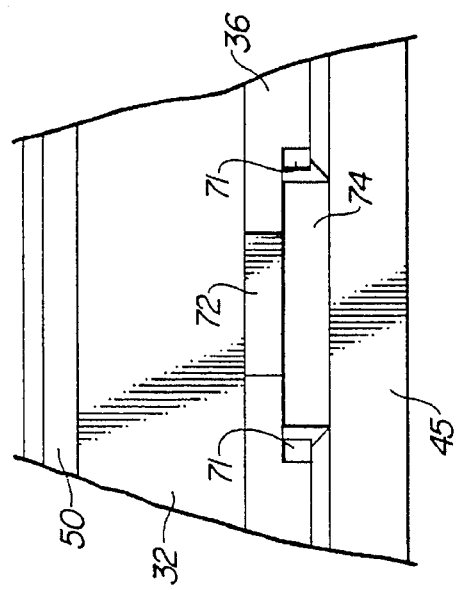
FIG. 16 is an enlarged fragmentary elevational view looking in the direction of the arrows along line 16—16 of FIG. 15.
Figure 15:
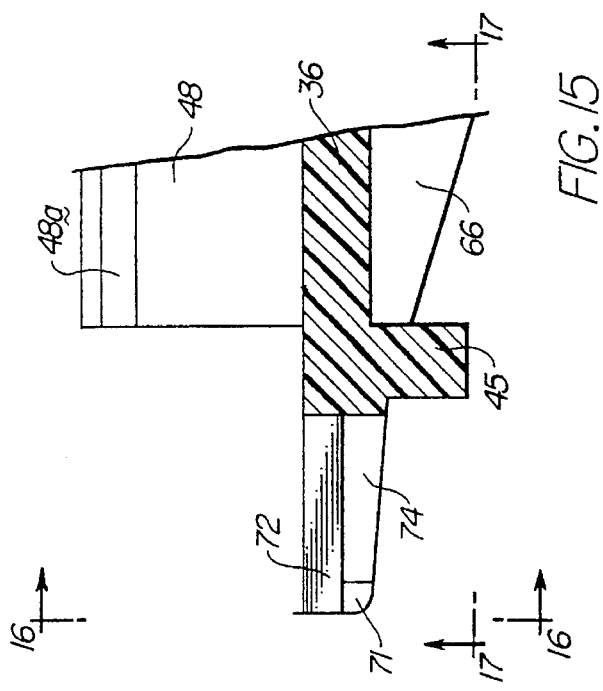
FIG. 15 is a cross-sectional view taken along line 15—15 of FIG. 1.

As best illustrated in FIGS. 1, 2, 7 and 13 of the drawing, latches 60 are formed adjacent opposite ends of the door portion 20 and the body portion 30 of housing 10. Each latch 60 comprises a resilient leg 62 having an opening 64 extending therethrough and an out-turned flange 65. A pair of ribs 63 extend longitudinally of leg 62 on opposite sides of opening 64, as best illustrated in FIGS. 3 and 11 of the drawing.

As best illustrated in FIGS. 1, 5 and 13 of the drawing, a pair of spaced tangs 66 extend outwardly from bottom wall 36 into slots 45a and 45b formed in rib 45 and each tang 66 has a detent 68 to receive a bead 69 formed on flange 65. It should also be noted that each detent 68 has an inclined ramp surface 67 positioned to engage the edge of flange 65 as it moves adjacent lip 37 on bottom wall 36 when the door portion 20 is moved toward the closed position. As flange 65 moves past lip portion 37 it engages the ramp surface 67 and is deflected outwardly as it continues to move along tang 66. As flange 65 clears the edge of tang 66 it snaps toward bottom wall 35 allowing tang 66 to enter the opening 64 in leg 62 of the latch mechanism. Bead 69 moves into detent 68 thereby retaining leg 62 in the latched position illustrated in FIG. 13 of the drawing until flange 65 is manually moved to disengage tang 66 from the opening 64 in leg 62 to permit movement of door portion 20 toward its open position illustrated in FIG. 7 of the drawing.

Figure 17:
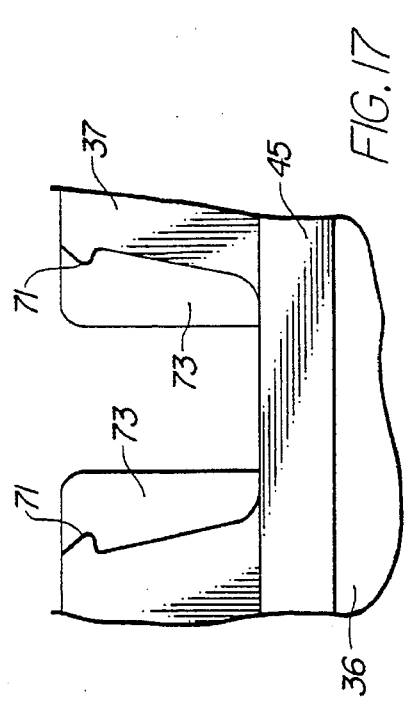
FIG. 17 is an enlarged fragmentary elevational view looking in the direction of arrows along line 17—17 of FIG. 15.
Figure 21:
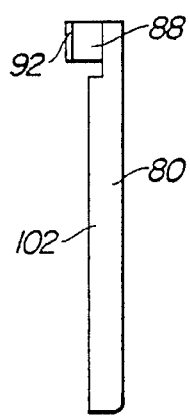
FIG. 21 is an end view of the grommet plate.

As best illustrated in FIGS. 1, 4 and 15–17 of the drawing, a plurality of windows 70 are formed in lip 37 of bottom wall 36 and spaced longitudinally of rib 45 each window 70 is formed by a slot 72 overlying a cut-out 74 formed in lip 37 on perforated plate 36. As best illustrated in FIG. 17, the walls 73 of cut-out 74 are inclined to form camming surfaces and have shoulders 71 formed therein for securing a grommet plate 80 for urging a seal member into sealing relation with the surface of perforated plate 36 adjacent entry ports 46, as will be hereinafter more fully explained.

Figure 6:
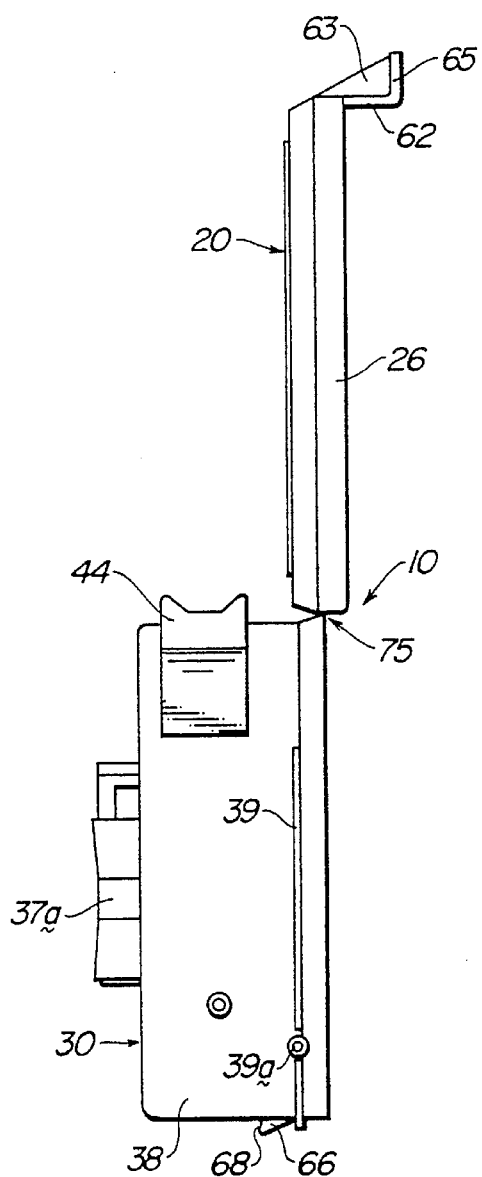
FIG. 6 is an elevational view of the left end of the housing.
Figure 9:
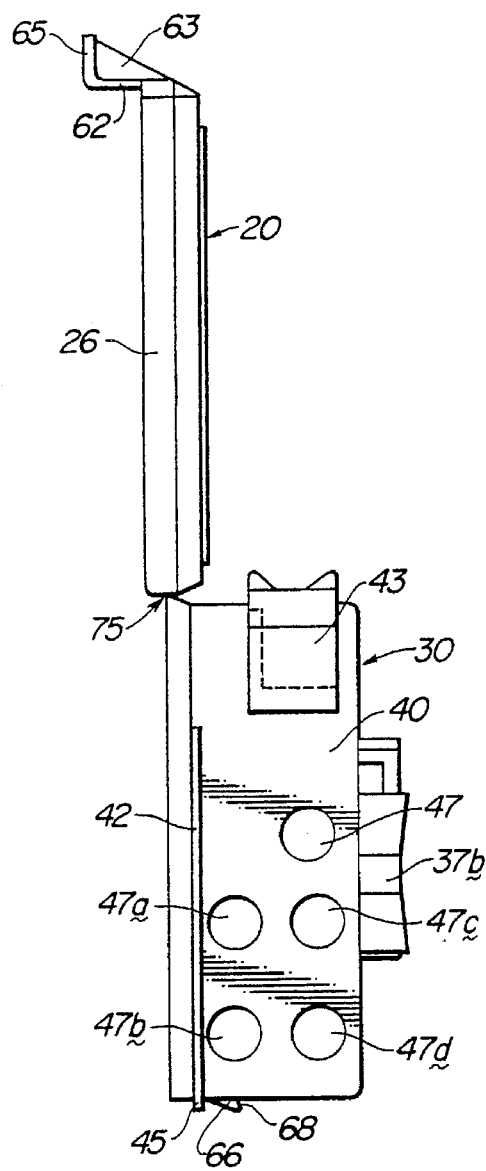
FIG. 9 is an elevational view of the right end of the housing, the door being illustrated in the open position.
Figure 10:
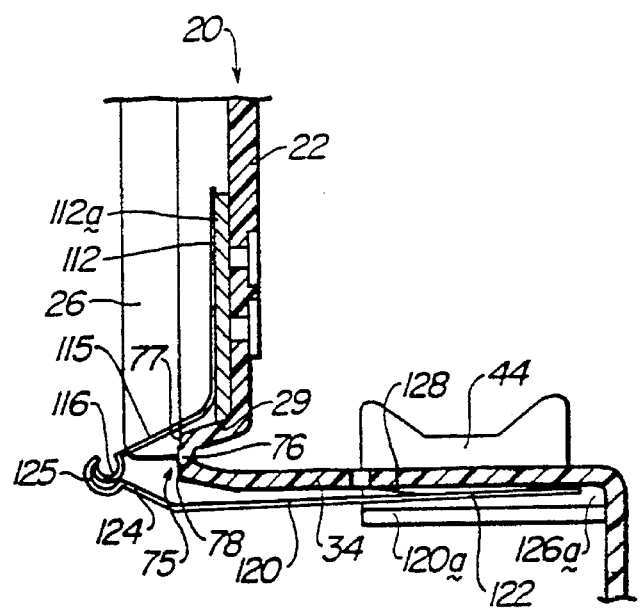
FIG. 10 is an enlarged cross-sectional view taken along line 10—10 of FIG. 1 with spring elements illustrated in FIGS. 29-32 mounted therein.

Referring to FIGS. 1 and 10 of the drawing, the numeral 75 generally designates a living hinge comprising a plastically deformable hinge strip 76 extending longitudinally of rib 29 on door portion 20 and longitudinally of wall 34 of body portion 30 to movably secure the door portion to the body portion of the housing 10. As best illustrated in FIG. 10 of the drawing, surfaces 77 and 78 on rim 29 and wall 34 move into engagement as door 20 is rotated in a counterclockwise direction as viewed in FIG. 10 of the drawing upon movement of door 20 from the open position illustrated in FIGS. 1 and 6 of the drawing to a closed position wherein leg 62 of latch assembly 60 engages detent 68 on the body portion of housing 30 to the position illustrated in FIG. 13 of the drawing.

From the foregoing it should be readily apparent that the housing 10, hereinbefore described, is of unitary construction and that the door portion 20 and body portion 30 are joined by a hinge portion 75. When the door portion 20 is moved to the closed position rim 26 extending around the periphery of the door covers the lip portion 37 of walls 36, 38 and 40 on the body portion of the housing to provide a seal between the door and body portions of the housing.

A grommet plate 80, best illustrated in FIGS. 18–26 of the drawing is removably mounted in chamber 35 of housing 10.

The upper surface of grommet plate 80 is illustrated in FIG. 18 of the drawing and is provided with an array of openings 81 positioned to correspond with the position of openings 46 in the array of entry ports formed in perforated wall 36 of housing 30. In the illustrated embodiment of grommet plate 80 each row 82 and 83 of openings 81 contains eight openings. The sixteen openings 46 in the illustrated embodiment will accommodate fifteen pairs of conductors for connection to a terminal block in chamber 35.

As best illustrated in FIGS. 18 and 19 of the drawing, a plurality of tines 85 are formed on an edge of the grommet plate 80 for connecting grommet plate 80 to the body portion 30 of the housing 10. Slots 84 and 86 are formed on opposite sides of a leg 88. Leg 88 has a downwardly projecting portion having a groove 89 between legs 90 and 92 having feet 94 and 96 on lower ends thereof.

Figure 22:
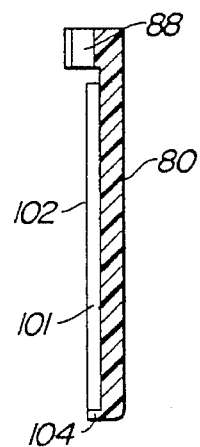
FIG. 22 is a cross-sectional view taken along line 22—22 of FIG. 20.
Figure 23:
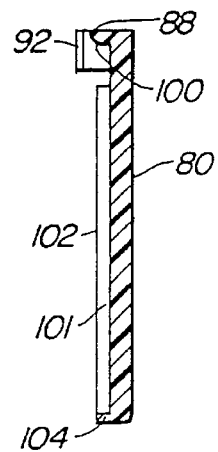
FIG. 23 is a cross-sectional view taken along line 23—23 of FIG. 20.
Figure 24:
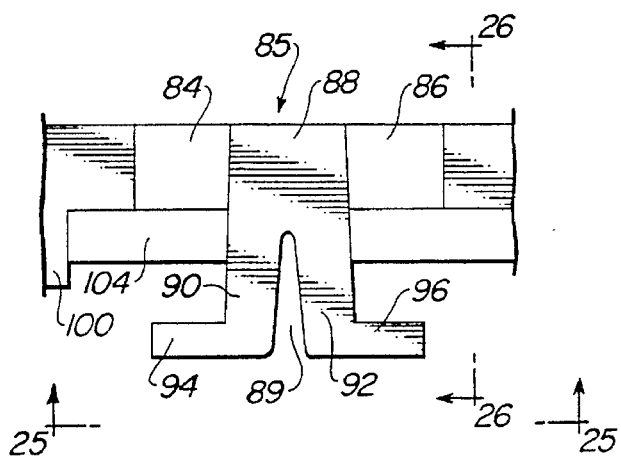
FIG. 24 is a fragmentary enlarged elevational view of a portion of the front of the grommet plate.
Figure 26:
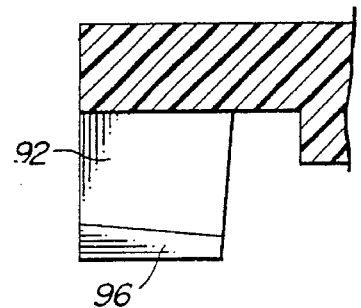
FIG. 26 is a cross-sectional view taken along line 26—26 of FIG. 24.
Figure 25:
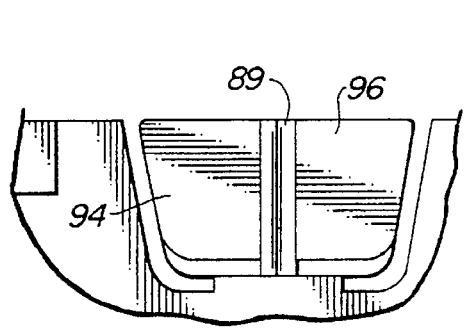
FIG. 25 is a view taken along line 25—25 of FIG. 24.

As best illustrated in FIGS. 20, 22 and 23, the lower surface of grommet plate 80 is recessed leaving beveled shoulders 100 adjacent the edge of the plate in which tines 85 are formed and leaving shoulders 102 adjacent opposite ends of grommet plate 80 and a longitudinally extending shoulder 104 along the rear edge thereof. The recess 101 in plate 80 has a shoulder 103 formed adjacent one corner thereof to assure that a resilient seal element containing openings through which conductors extend is properly aligned with entry ports 81 formed in grommet plate 80 and entry ports 46 formed in perforated wall 36.

Figure 27:
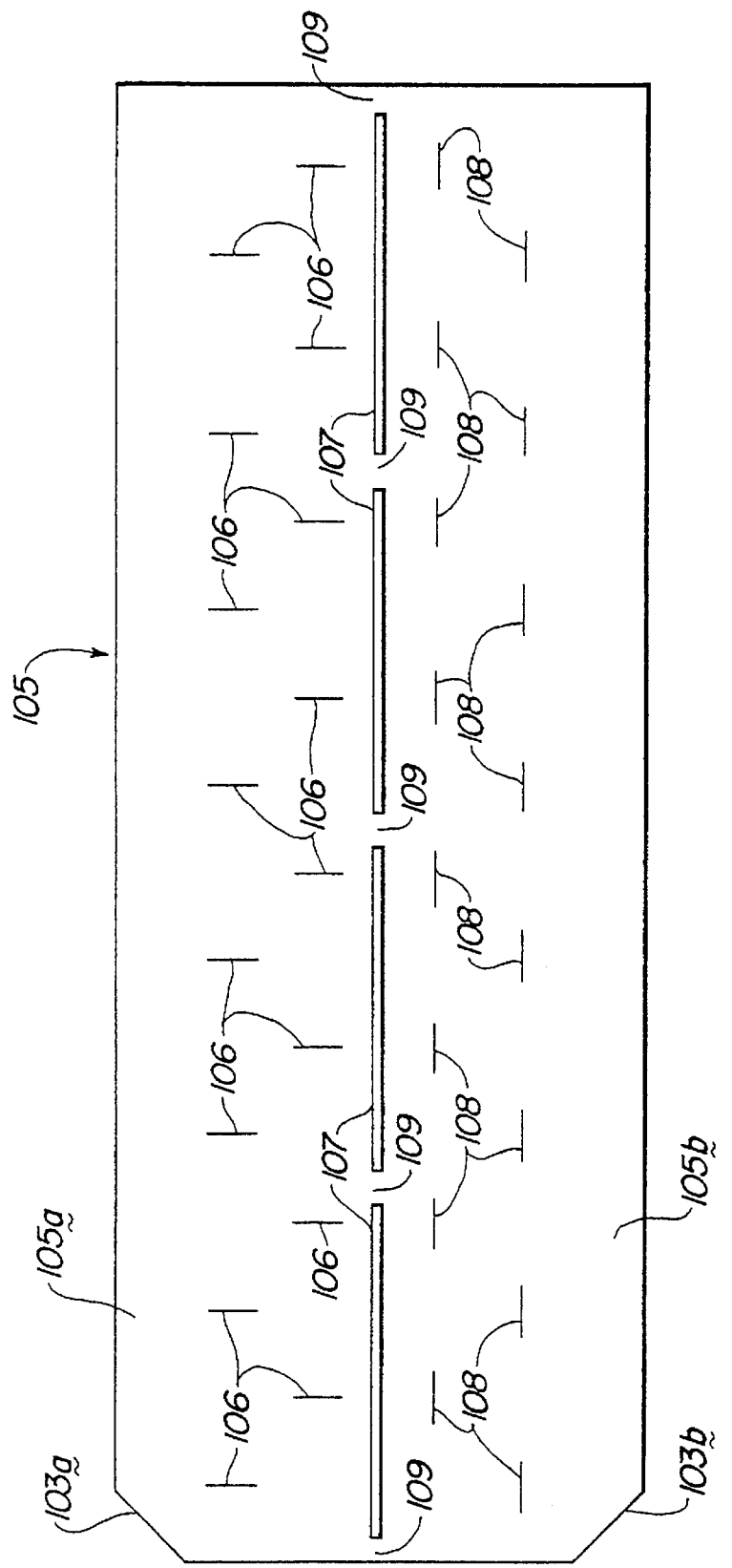
FIG. 27 is a plan view of a resilient grommet strip.

A resilient seal element 105 is illustrated in FIG. 27 of the drawing. Seal element 105 preferably comprises a resilient sheet of rubber or other deformable material and has a first array of slits 106 formed in a first portion of the sheet and extending in a first direction and having a second array of slits 108 formed in a second portion of the sheet and extending in a second direction. The sheet preferably has spaced slots 107 extending longitudinally thereof leaving deformable strips 109 therebetween to permit folding portion 105a of sheet 105 over portion 105b for positioning slits 106 over corresponding slits 108. It should be appreciated that slits 106 and slits 108 extend in opposite directions such that slits 106 criss-cross slits 98 to grippingly engage the outer surface of a conductor inserted through a pair of slits 106 and 108 to provide a seal around the conductor.

Two corners 103a and 103b of seal element 105 are cut off at an angle corresponding to the angle of shoulder 103 formed on the lower surface of grommet plate 80.

When sheet 105 of resilient material is folded along its center line such that slits 106 overlie and criss-cross slits 108 to form a grommet and shoulders 103a and 103b are positioned adjacent shoulder 103, folded sheet 105 is received in recess 101 and bounded by shoulders 100, 102 and 104.

Figure 28:
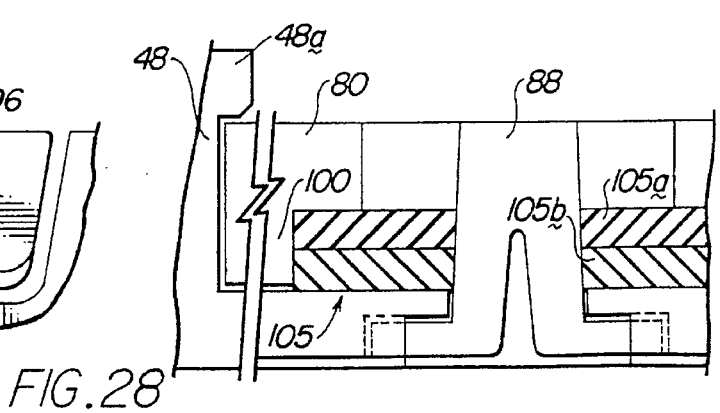
FIG. 28 is an enlarged fragmentary elevational view of a grommet plate and seal element secured to a perforated housing wall.

Referring to FIG. 28 of the drawing, grommet plate 80 is configured to slide between spacers 48 and 49 on bottom wall 36 of the body portion of the housing 10. Ledges 48a and 49a engage the upper surface of grommet plate 80 as it is slid toward the back wall 32 of the body portion of the housing. Overlying portions 105a and 105b of resilient sheet 105 are captured between the lower surface of grommet plate 80 and the upper surface of perforated wall 36. Tines 85 are spaced to correspond to the spacing of windows 70 formed in the edge of perforated wall 36. When the ends of feet 94 and 96 on tines 85 move toward windows 70, surfaces 73 urge legs 90 and 92 together until the ends of feet 94 and 96 clear shoulders 71 formed in windows 70. Ends of feet 74 and 76 spring outwardly behind shoulders 71 for retaining grommet plate 80 and resilient sheet 105 in a predetermined position relative to perforated wall 36 of the housing.

Figure 29:
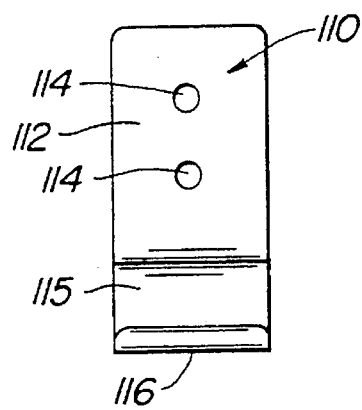
FIG. 29 is a plan view of a door spring.
Figure 30:
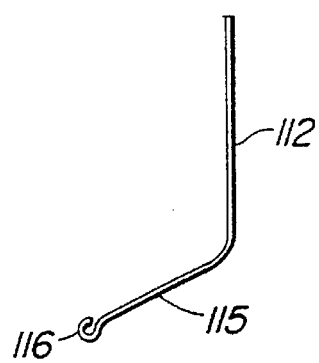
FIG. 30 is a side elevational view of the door spring.
Figure 31:
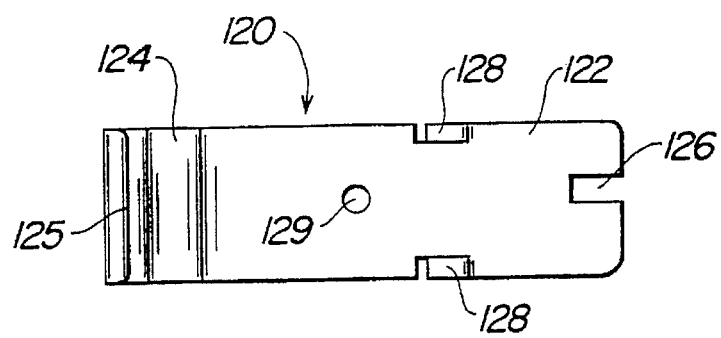
FIG. 31 is a plan view of a spring base.
Figure 32:
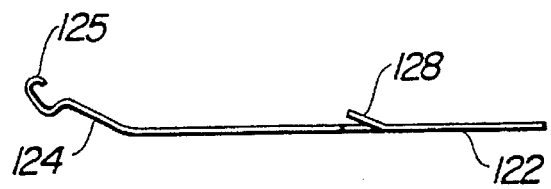
FIG. 32 is a side elevational view of the spring base.

A door spring is illustrated in FIGS. 29 and 30 of the drawing and a door spring base is illustrated in FIGS. 31 and 32. Door spring 110 has a leg 112 having holes 114 formed therein and a deflected leg 115 having a rolled end 116.

Referring to FIG. 1 of the drawing, door spring 110 is secured to the door 20 by rivets extending through holes 114 in leg 112 and through holes 114a formed in the central portion of the door. A pair of ribs 112a are formed on the inner surface of door 20 and extend along opposite sides of leg 112 of the door spring 110 for retaining it in position.

Spring base element 120, best illustrated in FIGS. 31 and 32 of the drawing, has a leg 122 and a deflected leg portion 124. Leg 122 has a notch 126 formed in one end thereof and has flap portions 128 deflected out of the plane of leg 122. The upper wall 34 of the body portion 30 of housing 10 has a pair of inwardly facing projections 120a formed thereon to form a groove 122a into which leg 122 of spring base 120 extends. A projection 126a on wall 36 extends into slot 126 on leg 122 and flaps 128 snap in behind ends of projections 120a for retaining base element 120 in position. Leg 122 has a hole 129 formed therein to receive a rivet which extends through a hole 129a formed in wall 34 of the housing, as illustrated in FIG. 8 of the drawing.

When the door is moved from its closed position to the open position illustrated in FIG. 4 of the drawing, the rolled end 116 on leg 115 of door spring 110 moves into engagement with the rolled end 125 on the end of leg 124 of base spring 120 and snaps into a position for retaining door 20 in an open position. When an external force is applied to door 20 for moving it toward a closed position leg 124 of base spring 120 is deflected downwardly allowing the rolled end 116 on door spring 110 to move along the upper surface of leg 124 and the upper surface of leg 122 of base spring 120 toward flaps 128. Thus, door spring 110 urges door 20 toward an open or a closed position depending on the position of rolled end 116 on leg 115 relative to base spring 110.

I claim:

1. A terminal housing to be suspended from a strand or cable for aerial mounting or secured to a post, pole or wall for surface mounting comprising: a body portion having surrounding walls and a door portion of unitary molded construction joined by a hinge portion to form an interior chamber defined by said surrounding walls, said body portion and said door portion, said walls of said body portion having tapered lip portions, at least one of said walls having an array of entry ports to receive conductors, said door portion having a slot for receiving said tapered lip portions to seal between said door portion and said body portion, said body portion having unitary mounting brackets for securing said body portion for aerial mounting, said body portion further having means for mounting said body portion on a generally vertical surface, said hinge portion being deformable to permit movement of said door portion relative to said body portion between open and closed positions.

2. A terminal housing according to claim 1, with the addition of spacer portions and ledge portions on said body portion in said chamber; and grommet means having an array of openings to receive conductors, said spacer and ledge portions urging said grommet means into sealing relation with the conductors and the body portion adjacent said array of entry ports.

3. A terminal housing according to claim 1, said body portion and said door portion having latch means securing said door portion relative to said body portion.

4. A terminal housing according to claim 1, said mounting brackets being connectable to a horizontally extending support strand.

5. A terminal housing according to claim 1, at least two of said walls having an array of entry ports to receive conductors.

6. A terminal housing according to claim 5, with the addition of a spacer portion and a ledge portion on said body portion in said chamber; and grommet means having an array of openings to receive conductors, said spacer and ledge portions urging said grommet means into sealing relation with the conductors and the body portion adjacent said array of entry ports.

7. A terminal housing comprising: an integral housing body formed by a back wall, spaced end walls having brackets for aerial mounting, and spaced side walls secured together to form an interior chamber and a door, said door being secured to said integral housing body by a living hinge along one edge thereof, at least one of said walls having an entry port formed therein; retainer means adjacent said entry port; and a sheet of folded resilient grommet material having intersecting slits extending therethrough, said sheet of grommet material being positionable in said retainer means adjacent said entry port to provide a seal between a conductor and the housing body when the conductor is positioned through said entry port.

8. A terminal housing comprising: a body portion having surrounding walls and a door portion joined by a hinge portion to form an interior chamber, said interior chamber in said body portion being bounded by said walls and said door portion, said walls having lip portions, at least one of said walls having an entry port to receive a conductor, said door portion having a slot formed therein to receive said lip portions to seal between said door portion and said body portion, said body portion having spacer and ledge portions in said chamber; and a sheet of resilient material having at least one slit formed therein to receive the conductor, said spacer and ledge portions being positioned to urge said sheet of resilient material into sealing relation with the conductor and the body portion adjacent said entry port.

9. A terminal housing according to claim 8 further comprising: a grommet plate having an entry port, said grommet plate engaging said ledge portions to urge said sheet of resilient material into sealing relation with said body portion adjacent said entry port and to align said entry port in said body portion and said grommet plate and said slit in said sheet of resilient material to permit routing the conductor therethrough.

10. A terminal housing comprising: a body portion having walls and a door portion joined by a hinge portion to form an interior chamber, said interior chamber in said body portion being bounded by said walls and said door portion, said walls having lip portions, said door portion having a slot formed therein to receive said lip portions to seal between said door portion and said walls, at least one of said walls having an entry port to receive a conductor, said body portion having spacer portions and ledge portions in said chamber; and a sheet of resilient material having a pair of spaced slits formed therein, said sheet being folded to position said slits in juxtaposed relation to permit routing of the conductor through the entry port and through each of said slits of said pair of slits, said spacer and ledge portions urging said sheet of resilient material into sealing relation with the conductor and the body portion adjacent said entry port.

11. A terminal housing comprising: a body portion and a door portion joined by a hinge portion said body portion having walls to form an interior chamber defined by said walls on said body portion and said door portion, at least one of said walls having an array of entry ports to receive conductors, seal means between said door portion and said body portion to seal between said door portion and said body portion, said body portion having spacer portions and ledge portions in said chamber; and a sheet of resilient material having an array of slits formed therein to receive the conductors, said spacer portions and said ledge portions urging said resilient sheet into sealing relation with the conductors and the body portion adjacent said array of entry ports.

12. A terminal housing comprising: a body portion having walls and a door portion joined by a hinge portion to form an interior chamber defined by said walls on said body portion and said door portion, at least one of said walls having an array of entry ports to receive conductors, said walls being bounded by lip portions, said door portion having a slot formed therein to receive said lip portions to seal between said door portion and said body portion, said body portion having spacer portions and ledge portions in said chamber; and a sheet of resilient material having an array of pairs of spaced slits formed therein, said sheet being folded to position said slits in juxtaposed relation to permit routing the conductors through the entry ports and through each of said slits of said pair of slits, said spacer and ledge portions urging said sheet of resilient material into sealing relation with the body portion adjacent said array of entry ports.

13. A terminal housing according to claim 12 further comprising:

a plate having an array of entry ports, said plate engaging said ledge portions to urge said sheet of resilient material into sealing relation with said body portion adjacent said array of entry ports and to align said entry ports in said body portion and said plate and said pairs of slits in said sheet of resilient material to permit routing the conductors therethrough.

14. A terminal housing according to claim 13, said body portion and said door portion having latch means securing said door portion relative to said body portion.

15. A terminal housing to be suspended from a strand or cable for aerial mounting or secured to a post, pole or wall for surface mounting comprising: a generally rectangular body portion and a door portion joined by a hinge portion, said body portion being formed by a back wall, spaced end walls and spaced side walls secured together to form an interior chamber defined by said walls on said body portion and said door portion, at least one of said walls having an array of entry ports to receive conductors, said body portion and said door portion being of molded unitary construction and having unitary mounting brackets for securing said body portion for aerial mounting; and a spring engageable with said door portion and said body portion to resiliently retain said door portion in an open position.

16. A terminal housing to be suspended from a strand or cable for aerial mounting or secured to a post, pole or wall for surface mounting comprising:

an integral molded body portion, formed by a back wall, spaced end walls and spaced side walls secured together to form an interior chamber, and a door portion, each of said spaced end walls on said body portion having integral brackets for aerial mounting, said door portion being secured to said body portion by a living hinge, at least one of said walls having an entry port formed therein, said body portion and said door portion having at least one resilient leg and at least one tang positioned such that said resilient leg and said tang retain said door portion in a position for closing said interior chamber.

17. A terminal housing according to claim 16, said resilient leg having an opening extending therethrough and an out-turned flange having a bead formed thereon, said tang having a detent having an inclined ramp surface positioned to engage said out-turned flange for guiding said bead into said detent.

18. A terminal housing comprising:

an integral molded body portion, formed by a back wall, spaced end walls and spaced side walls secured together to form an interior chamber, and a door portion, said door portion having a central panel having an outer rim extending around three sides of said central panel, and a pair of lugs on said central panel spaced from said outer rim to provide slots between said lugs and said outer rim, at least a portion of one of said walls extending into said slot when said door portion is positioned to close said interior chamber, said door portion being secured to said body portion by a living hinge, at least one of said walls having an entry port formed therein, said body portion and said door portion having at least one resilient latch positioned such that said resilient latch retains said door portion in a position for closing said interior chamber.

19. A terminal housing according to claim 16, said body portion having mounting brackets formed thereon for securing said body portion for aerial mounting.

20. A terminal housing according to claim 16, said body portion and said door portion being connected by a deformable living hinge that forms a seal between said door portion and said housing body.

21. A terminal housing having an integral molded body portion, formed by a back wall, spaced end walls and spaced side walls secured together to form an interior chamber, and a door portion, said door portion being secured to said body portion by a deformable living hinge that forms a seal between said door portion and said body portion, at least one of said walls having an entry port formed therein, said body portion and said door portion having at least one resilient latch positioned such that said resilient latch retains said door portion in a position for closing said interior chamber, said door portion comprising: a central panel having an outer rim extending around three sides of said central panel, and a pair of lugs on said central panel spaced from said outer rim to provide slots between said lugs and said outer rim, at least a portion of one of said walls extending into said slot when said door portion is positioned to close said interior chamber, said outer rim and said living hinge substantially encircling said interior chamber and being urged by said resilient latch into sealing engagement with said spaced end walls and said spaced side walls to prevent intrusion of dust and moisture.

22. A terminal housing according to claim 16, said back wall having an outer surface provided with means for mounting said housing body on a generally vertical surface.

23. A terminal housing according to claim 16, said back wall having an inner surface provided with means for mounting a terminal block in said interior chamber.

* * * * *